United States Patent Office 3,441,627
Patented Apr. 29, 1969

3,441,627
PREPARATION OF CIS-1,4-DIENES
Wolfgang Schneider, Broadview Heights, Ohio, assignor to The B. F. Goodrich Company, a corporation of New York
No Drawing. Filed July 6, 1965, Ser. No. 469,880
Int. Cl. C07c 11/12
U.S. Cl. 260—680                4 Claims

ABSTRACT OF THE DISCLOSURE

Cis-1,4-dienes, which are useful third monomers in the preparation of vulcanizable rubbers with ethylene and propylene, are obtained by reacting a 1,3-diene containing 4 to 6 carbon atoms with ethylene in the presence of a catalyst consisting of an iron compound, an alkyl aluminum compound and an organic nitrogen compound.

---

This invention relates to an improved method for preparing cis-1,4-dienes.

1,4-hexadiene is used as a third monomer in preparing vulcanizable rubbers of ethylene and propylene terpolymers. In preparing 1,4-hexadiene by known methods, a mixture of cis- and trans-isomers is obtained. It is desirable to have an all cis-1,4-hexadiene available for preparing vulcanizable ethylene-propylene rubbers. At present cis-1,4-hexadiene is an expensive monomer since it first must be separated from the trans-isomer and the trans-isomer then discarded, which represents a loss of costly raw materials.

This invention now provides an economical method for readily preparing 1,4-hexadiene, methyl-1,4-hexadienes and 1,4-heptadiene of predominantly cis-structure in high yields to the exclusion of the trans-structure, which comprises reacting a 1,3-diene such as butadiene, isoprene or piperylene and ethylene in the presence of a catalyst which is formed by reacting together a reducible iron compound with a reducing agent such as alkali, alkaline earth and aluminum metals, hydrides, alkoxides and alkyls thereof, and an organic compound which is an electron donor in this reaction for the transition metal, which compounds are described hereinafter.

The reducible iron compound may be any di- or trivalent compound of iron which is readily reduced by an alkyl metal compound. Useful iron compounds include the chlorides, bromides, sulfates, hydroxides, nitrates, oxalates and other salts of inorganic and organic acids. Organic compounds useful in the process are iron chelates in which the iron is attached to two functional groups of a molecule by a main valence bond and coordinately, for example, iron acetylacetonate. The iron compounds are preferably used in an anhydrous state.

The reducing agents, which may be I-A, II-A, or III-A metals, hydrides, or alkyl derivatives thereof, are usually organo-metallic compounds, including lithium alkyls, beryllium alkyls, aluminum alkyls, and the like, mixtures of alkali, alkaline earth and aluminum metals and alkyl halides, and alkoxides. More usually employed are aluminum alkyls, alkyl alkoxides, hydrides and aluminum alkyl halides having the formula $R_3Al$ or $R_xAlX_y$ wherein R is an alkyl group containing 1 to 12 carbon atoms, preferably 2 to 8, X is an alkoxyl, hydride or a halogen atom, and $x$ is 1 or 2, $y$ is 1 or 2, and $x+y=3$. Typical compounds include triethyl aluminum, tributyl aluminum, triisobutyl aluminum, diethyl aluminum chloride, dibutyl aluminum chloride, ethyl aluminum dichloride, diethyl aluminum ethoxide, propyl aluminum dichloride, diisobutyl aluminum chloride, and mixtures thereof. Other useful organo-metallic compounds include zinc diethyl, triisobutyl borane, and Grignard reagents as ethyl magnesium bromide and other alkyl magnesium halides, also where the alkyl group contains 1 to 12 carbon atoms.

In addition to the organo-metallic compounds, metals which have a reducing action on di- or trivalent iron compounds can be used as reducing agents, for example metals belonging to I-A, II-A or III-A or the Lanthanide group of the Periodic Table. Of these metals it is preferred to use lithium, sodium, potassium, magnesium, calcium, strontium, beryllium, barium, aluminum, gallium, indium, and cerium. They are conveniently used in a condition in which they have a large surface, for example, in the form of chips or powder. Obviously, alloys or mixtures of two of the said metals may also be used. In many cases the use of an alkyl or aryl halide or a halide of an element of group II-A or III-A along with the metal is of advantage. Of the halides, the bromides and chlorides are preferred. Examples of suitable compounds are: allyl chloride and bromide, ethyl chloride and bromide, boron trichloride, aluminum chloride, and the like.

The electron donors suitable for use for preparing the active catalysts include compounds which contain linking electron pairs, such as organic compounds of an element of groups V-A and VI-A of the Periodic Table including nitrogen, phosphorous, arsenic, antimony, sulfur, and oxygen. A preferred group of compounds of group V-A are those containing nitrogen or phosphorous present in the compound in a trivalent state and which contain alkyl or aryl radicals and which may contain other substituents in an ortho, para, or meta position to the bridge. Typical of such compounds are triphenyl phosphine, triphenyl phosphite, triphenyl stibine, triethylamine, triphenylamine, trimethylene diamine, triethylene diamine, pyridine, piperidine, morpholine, acrylonitrile, benzonitrile, and acetamide. A useful group of compounds containing VI-A elements are diphenyl ether, diphenylsulfone, butadiene cyclic sulfone and isoprene cyclic sulfone. Another group of electron donors which may be used in the process of invention include aromatic halogen compounds including chlorobenzene, dichlorobenzene, ortho- and meta-chlorobenzonitrile and trichloroaniline. Preferred are alkyl amines containing 2 to 12 carbon atoms, acrylonitrile and benzonitrile.

In the preparation of the catalyst, the iron compound and reducing agent are reacted together in the presence of a 1,3-diene. The electron donor may be added during this reaction or thereafter. Suitable 1,3-dienes are butadiene-1,3, isoprene and piperylene.

The reaction may be conducted over a wide range of temperatures and pressures. Normally, the reaction is conducted at a temperature above room temperature, that is, about 25° C. to temperatures as high as about 250° C. More preferably, the reactions are conducted at temperatures in the range of about 50° C. to 150° C. At higher temperatures, the catalyst decomposes, and undesirable by-products are formed.

The reaction may be carried out at atmospheric pressure, but usually is at higher pressure. This is determined by the vapor pressure of the 1,3-diene and the solubility of ethylene in the 1,3-diene at that temperature and pressure. The pressure of the reactor may range from about 100 p.s.i.g. to about 5,000 p.s.i.g., more normally from about 200 p.s.i.g. to about 1,000 p.s.i.g., and more preferably less than 1,000 p.s.i.g. as 500 p.s.i.g. if no solvent is present.

The molar ratio of reactants include from about $10^{-1}$ to $10^{-8}$, preferably $10^{-3}$ to $10^{-5}$ mols of iron per mol of butadiene-1,3; 0.1 to 10 mols of iron per mol of butadiene-1,3; 0.1 to 10 mols of electron donor per mol of iron, preferably 0.25 to 2 mols per mol of iron; and 1 mol of iron to 1 and 10 mol equivalents of reducing compound.

It is convenient to carry out the new process in the starting materials (1,3-diene) without a solvent. If desired to use solvents, suitable solvents include aliphatic, cycloaliphatic and aromatic hydrocarbons, such as hexane, heptane, cyclooctane, benzene or a hydrocarbon mixture of petroleums boiling between 60 and 200° C. Purified anhydrous starting materials and solvents are employed.

EXAMPLE I 10 grams (40 millimols) of ferrous acetylacetonate and 2 grams (20 millimols) of triethylamine were stirred into 3 quarts of butadiene-1,3 which was then cooled to —10° C., and 30 cc. of triisobutyl aluminum in 30 cc. of butadiene-1,3 was added thereto. This catalyst solution was then charged to a stirred 15-gallon reactor containing 9 gallons of dry butadiene-1,3 treated with triisobutyl aluminum. Ethylene was charged to obtain a pressure of 200 p.s.i.g. at room temperature and the reactor was then heated to 60° C. and maintained at 65° C. for 23 hours. During the reaction, the average pressure of ethylene was 500 p.s.i.g. The reactor was vented and 10 gallons of product was recovered. This product contained 63% of cis-1,4-hexadiene. The cis-1,4-hexadiene was readily isolated by distillation and had a purity of 99+1%.

EXAMPLE II

The procedure of Example I was repeated with 0.1 mol of ferrous acetylacetonate and 0.05 mol of benzonitrile reacted with 100 cc. of triisobutyl aluminum. The reaction was run for 23 hours at 80° C. and the ethylene pressure was maintained at 500 p.s.i.g. 10 gallons of reaction product was obtained from which cis-1,4-hexadiene was isolated by distillation in a yield of 66%.

EXAMPLE III

The procedure of Example I was repeated with a number of other electron donors. Reaction conditions and yields are set forth in Table 1 below.

EXAMPLE V

A catalyst solution was prepared by reacting 25.4 grams (0.1 mol) of ferrous acetylacetonate, 2.65 grams (0.05 mol) of acrylonitrile with 75 cc. of triisobutyl aluminum in 3 quarts of isoprene at —10° C. This solution was then charged to 10 gallons of isoprene dried with triisobutyl aluminum in a 15-gallon reactor. The reactor was heated to 80° C. and pressured with ethylene to 550 p.s.i.g. The reaction was run for 25 hours at 80° C. with an average ethylene pressure of 500 p.s.i.g. 11 gallons of crude product was obtained and was found to contain 49% of 4-methyl-cis-1,4-hexadiene and 1% of 5-methyl-cis-1,4-hexadiene (78% based on isoprene converted).

When this example was repeated with diphenylsulfone, triethylamine, morpholine, and benzonitrile, yields of 59 to 78% 4-methyl- and 5-methyl-cis-1,4-hexadiene based on isoprene conversion were obtained. When these examples are repeated with other Group VIII metals, different results are obtained. With palladium compounds, trans-1,4-hexadiene is obtained; and polymers are obtained with cobalt.

EXAMPLE VI 0.324 gram (2 millimols) of ferric chloride and 0.1 gram (1 millimol) of triethylamine were stirred into 150 cc. of butadiene-1,3 which was then cooled to —10° C. and 2 cc. of triisobutyl aluminum in 10 cc. butadiene-1,3 was added thereto. This mixture was then charged to an autoclave. 42 grams of ethylene was then charged at room temperature and the reactor was then heated to 55° C. for 20 hours. The resulting product contained 41% of cis-1,4-hexadiene. The remainder was polymer and unreacted butadiene and ethylene.

EXAMPLE VII

The procedure of Example VI was repeated with piperylene, in place of butadiene, 4 millimols of ferrous acetylacetonate, 0.174 gram (2 millimols) of morpholine and 0.05 mol of benzonitrile reacted with 3 cc. of triisobutyl

TABLE 1

| Run | Metal:electron donor (mol ratio) | Temp. (° C.) | Average ethylene press. (p.s.i.g.) | Time (hrs.) | Percent butadiene conversion | Percent hexadiene |
|---|---|---|---|---|---|---|
| (1) | Fe:1 triethylamine | 70 | 575 | 52 | 90 | 61 |
| (2) | Fe:½ triethylamine | 80–140 | 800 | 2 | 94 | 61 |
| (3) | Fe:½ triethylamine | 65 | 1,700 | 23 | 96 | 66 |
| (4) | Fe: 1 benzonitrile | 80 | 75 | 20 | 98 | 67 |
| (5) | Fe:½ benzonitrile | 65 | 500 | 18 | 98 | 71 |
| (6) | Fe: ½ benzonitrile | 80 | 550 | 10 | 98 | 72 |
| (7) | Fe:¼ benzonitrile | 80 | 575 | 23 | 97 | 69 |

EXAMPLE IV

The procedure of Example I was repeated with the exception that the reactions were conducted in a 3-liter autoclave using additional electron donors. The reaction conditions and yields obtained are set forth in Table 2 below. Polyalkylene polyamines, particularly trialkylene diamines containing 2 to 10 carbon atoms are particularly useful in this reaction.

aluminum. The reaction was run for 60 hours at 55° C., 3-methyl-cis-1,4-hexadiene and cis-1,4-heptadiene were obtained in a yield of 80% at a conversion of 20%.

Example VI was repeated with (1) 4 millimols of ferrous sulfate and (2) 4 millimols of ferrous oxalate. Cis-1,4-hexadiene was obtained in each case. Example VI was also repeated using 4 millimols of ferrous acetylacetonate and three other reducing agents: (1) 10 millimols of zinc-

TABLE 2

| Run | Metal:electron donor (mol ratio) | Temp. (° C.) | Average ethylene press. (p.s.i.g.) | Time (hrs.) | Percent butadiene conversion | Percent hexadiene |
|---|---|---|---|---|---|---|
| (1) | Fe:½ morpholine | 65 | 3,200 | 18 | 98 | 50 |
| (2) | Fe:½ triethylenediamine | 80 | 2,700 | 4 | 98 | 50 |
| (3) | Fe:½ chlorobenzene | 85 | 3,000 | 20 | 98 | 50 |
| (4) | Fe:½ triphenylstibine | 80 | 3,600 | 47 | 60 | 60 |
| (5) | Fe:½ diphenylsulfone | 65 | 250 | 23 | 94 | 56 |
| (6) | Fe:½ triethylamine | 75 | 250 | 19 | 97 | 58 |
| (7) | Fe:½ triethylamine | 80 | 265 | 19 | 95 | 63 |
| (8) | Fe:¼ triethylamine | 70 | 550 | 43 | 99 | 62 |
| (9) | Fe:½ benzonitrile | 70 | 1,300 | 20 | 95 | 43 | diethyl, (2) 10 millimols of ethyl magnesium bromide, and (3) 10 millimols of triisobutyl borane. Excellent yields of cis-1,4-hexadiene were obtained with (1) and (2), and acceptable yields with (3).

The cis-1,4-dienes polymerize readily with ethylene and propylene to form sulfur vulcanizable products. One commercial and economic advantage of this process is that polymerization grade butadiene-1,3 and isoprene are not required. Streams from ethylene cracking units which contain 1.3-dienes may be used in preparing the cis-1,4-dienes.

I claim:

1. The method for preparing cis-1,4-dienes which comprises reacting a 1,3-diene selected from the group consisting of butadiene-1,3, isoprene and piperylene with ethylene in the presence of a catalyst formed by reacting together in the presence of said 1,3-diene, about $10^{-1}$ to $10^{-8}$ mols of iron per mol of 1,3-diene of a reducible iron compound selected from the group consisting of an iron salt of an inorganic acid, an iron salt of an organic acid and an iron chelate with about 1 to 10 mol equivalents per mol of iron of an alkyl aluminum compound having the structure $R_3Al$ wherein R is an alkyl group containing 1 to 12 carbon atoms; and about 0.1 to 10 mols, per mol of iron, of an organic nitrogen compound selected from the group consisting of acetonitrile, benzonitrile, and polyalkylene polyamines containing 2 to 10 carbon atoms.

2. The method of claim 1, wherein the reducible iron compound is iron acetylacetonate.

3. The method of claim 2, wherein the concentration of the iron compound is present as $10^{-3}$ to $10^{-5}$ mols of iron per mol of 1,3-diene, the alkyl aluminum compound is triisobutyl aluminum and 0.25 to 2 mols organic nitrogen compound per mol of iron is employed.

4. The method of claim 3, wherein the organic nitrogen compound is a trialkylene diamine.

References Cited

UNITED STATES PATENTS

| 3,219,716 | 11/1965 | Wittenberg et al. | 260—666 |
| 3,244,678 | 4/1966 | Tocker | 260—85.3 |
| 3,306,948 | 2/1967 | Kealy | 260—680 |
| 3,309,418 | 3/1967 | Hata | 260—680 |

OTHER REFERENCES

Hata, J. Am. Chem. Soc., vol. 86, p. 3903 (1964).

Iwamoto et al., Bull. Chem. Soc. Japan, vol. 39, pp. 2001–2004 (1966).

PAUL M. COUGHLAN, JR., *Primary Examiner.*

PO-1050
(5/69)

UNITED STATES PATENT OFFICE
CERTIFICATE OF CORRECTION

Patent No. 3,441,627          Dated April 29, 1969

Inventor(s) Wolfgang Schneider

It is certified that error appears in the above-identified patent and that said Letters Patent are hereby corrected as shown below:

Column 2, line 69, delete "0.1 to 10 mols of iron per mol of butadi-"; column 2, line 70, delete "ene-1,3;".

SIGNED AND
SEALED
APR 7 1970

(SEAL)
Attest:

Edward M. Fletcher, Jr.
Attesting Officer

WILLIAM E. SCHUYLER, JR.
Commissioner of Patents